United States Patent [19]
Crumb et al.

[11] Patent Number: 5,161,375
[45] Date of Patent: Nov. 10, 1992

[54] SPRING CAGING FOR A MASTER CYLINDER

[75] Inventors: Donald A. Crumb; Robert K. Wilson, both of Granger, Ind.

[73] Assignee: Allied-Signal Inc., Morristown, N.J.

[21] Appl. No.: 788,627

[22] Filed: Nov. 5, 1991

[51] Int. Cl.$^5$ .................. B60T 11/20; B60T 11/28
[52] U.S. Cl. .................. 60/562; 60/585; 60/589
[58] Field of Search .................. 60/533, 547.1, 562, 60/585, 588, 589

[56] References Cited

U.S. PATENT DOCUMENTS

| | | | |
|---|---|---|---|
| 3,427,807 | 2/1967 | Moyes | 60/589 |
| 4,372,117 | 2/1983 | Kobayashi | 60/588 X |
| 4,472,947 | 9/1984 | Nomura et al. | 60/589 X |
| 4,550,567 | 11/1985 | Schaefer | 60/562 |
| 4,939,901 | 7/1990 | Saalbach et al. | 60/589 X |
| 5,005,350 | 4/1991 | Reinartz et al. | 60/562 |

FOREIGN PATENT DOCUMENTS

| | | | |
|---|---|---|---|
| 553431 | 12/1956 | Italy | 60/585 |
| 0070759 | 5/1982 | Japan | 60/589 |

*Primary Examiner*—Edward K. Look
*Assistant Examiner*—Hoang Nguyen
*Attorney, Agent, or Firm*—Leo H. McCormick, Jr.; Ken C. Decker

[57] ABSTRACT

A caging arrangement for limiting the extension of springs in a bore. The caging arrangement includes cylindrical members which are connected to pistons in a master cylinder. The cylindrical members which are joined to the pistons and communicates the force of piston return springs to urge the pistons toward a rest positions while a valve return springs retained by the cylindrical members urges valves toward stops to control fluid communication between a reservoir and pressure chambers associated with the pistons.

11 Claims, 1 Drawing Sheet

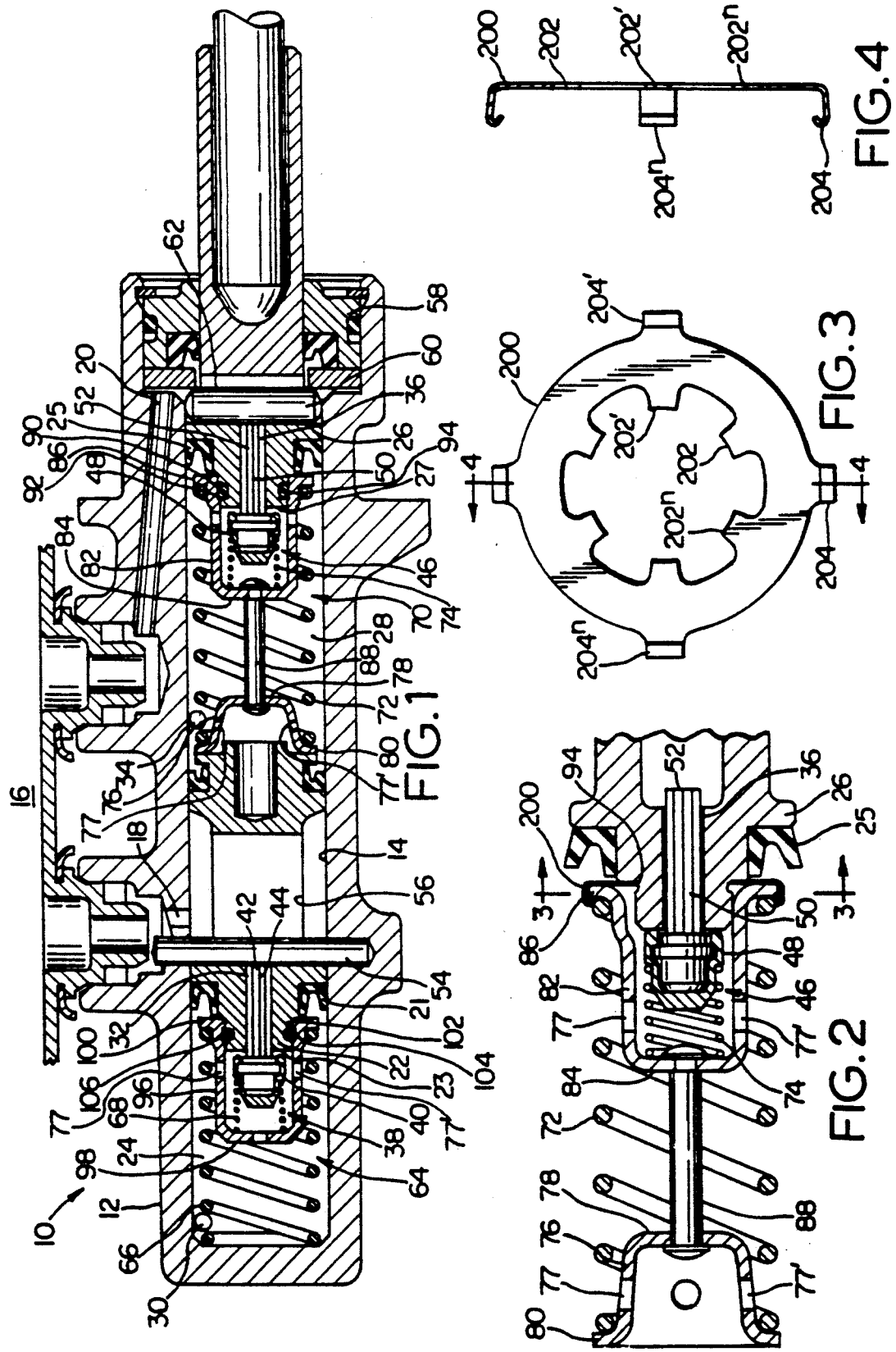

SPRING CAGING FOR A MASTER CYLINDER

This invention relates to a caging arrangement for retaining piston return and valve return springs in the bore of a master cylinder.

In prior art master cylinders such as illustrated in U.S. Pat. No. 3,296,798, it is common practice to directly communicate a reservoir to pressurizing chambers through compensating ports. Pistons located in the pressurizing chambers have lip seals which move past the compensating ports in response to an input force to seal the pressurizing chambers from the reservoir and develop pressurizing fluid to effect a brake application. This type master cylinder performs in an adequate manner, however, under some circumstances after an extended period of use, the lip seals may be cut or damaged by the compensating ports.

In an effort to eliminate failures of master cylinders caused by damaged lip seals, the lip seals were replaced by tilt valves such as disclosed in U.S. Pat. No. 3,357,183. This type of master cylinder operates in an acceptable manner, however, the travel required to move a piston to close the tilt valve reduces the effective stroke in the bore for pressurized fluid.

In an effort to reduce the loss of effective pressure development in a master cylinder it has been suggested in U.S. Pat. No. 4,939,901 that compensation between the reservoir and the pressurizing chambers could be achieved through the pistons in a master cylinder. The physical size of the components in this master cylinder requires a dexterity that is not normally found during mass production of a master cylinder.

In an effort to simplify the construction of a master cylinder, we have developed a caging arrangement for retaining piston return and valve springs in the bore of a master cylinder. In this master cylinder, compensation between the pressurizing chambers in the housing and a reservoir occurs through first and second passageways in the first and second pistons which are urged toward first and second stops by the return springs. An input member connected to the second piston moves the second piston to simultaneously interrupt communication through the first and second passageways to thereafter pressurize fluid in the first and second chambers by movement of the first and second pistons. The caging arrangement includes a first cylindrical member connected to a second cylindrical member by a linkage member. The first and second cylindrical members each have a base on a first end and an outward projecting flange on a second end. The linkage member effectively confines a return spring between the first and second outwardly projecting flanges. The second piston has an external groove thereon while the second cylindrical member has an internal groove thereon. A first ring which is partially located in external and internal grooves joining the second cylindrical member to the second piston and cage a valve return spring which urges the second valve toward the second piston. Similarly, the first piston has an external groove thereon while a third cylindrical member an internal groove thereon. A second ring joins the third cylindrical member to the first piston to cage a first valve which urges the first valve toward the first piston. In response to an input force applied to the second piston, movement of the second piston is simultaneously transferred to the first piston through the return spring. When the first and second pistons move away from the stops, the valve return springs urge the valves into engagement with the first and second pistons to simultaneous initiate development of pressurized fluid in the first and second pressurizing chambers.

It is an object of this invention to provide a master cylinder with a caging arrangement to retain the piston return spring and valve return spring within the bore of a housing.

It is a further object of this invention to provide an attachment member for resiliently joining cylindrical members to pistons in the bore of a master cylinder.

An advantage of this invention resides in the retention of lip seals on pistons of a master cylinder by resiliently attaching cylindrical body of caging members to the pistons.

These advantages and objects should be apparent from reading this specification while viewing the drawings wherein:

FIG. 1 is a cross sectional view of a schematic illustration of a master cylinder wherein the piston return springs and compensation valve return springs are caged within the bore in accordance with the principals of this invention;

FIG. 2 is a cross sectional view of a secondary embodiment of a attachment member for joining a caging arrangement to a piston;

FIG. 3 is a view taken along line 3—3 of FIG. 2; and

FIG. 4 is a view taken along line 4—4 of FIG. 3.

The master cylinder 10 for a brake system as shown in FIG. 1 has a housing 12 with a bore 14 connected to a reservoir 16 through first 18 and second 20 compensation ports. A first piston 22 is located in bore 14 to define a first pressure chamber 24 and a second piston 26 located in bore 14 to define a second pressure chamber 28. The first pressure chamber 24 is connected to the brake system through outlet port 30 and to reservoir 16 through a passageway 32 in the first piston 22. The second pressure chamber 28 is connected to the brake system through an outlet port 34 and to the reservoir 16 through a second passageway 36 in the second piston 26. A first valve 38 located in the first piston 22 has head 40 with a stem 42 attached thereto. Stem 42 which is located in passageway 32 has ribs 44 thereon to provide a flow path between a portion of bore 14 connected to reservoir 16 and chamber 24. A second valve 46 located in the second piston 26 has head 48 with a stem 50 attached thereto. Stem 50 which is located in passageway 36 has ribs 52 thereon to provide a flow path between a portion of bore 14 connected to reservoir 16 and chamber 28. A first pin 54 attached to housing 12 extends through a slot 56 in piston 22 located in the bore 14 forms a stop for limiting the movement of the first piston 22 in the bore 14. A second pin 60 retained in the bore 14 by bearing seal 58 located in a slot 62 in piston 26 forms a stop for limiting the movement of the second piston 26 in the bore 14. First resilient means 64 which includes return springs 66 and 68 urges the first piston 22 toward the first pin 54. When piston 22 engages pin 54 as shown in FIG. 1, stem 42 engages pin 54 to position head 40 away from face seat 23 and allow communication of fluid from reservoir 16 into chamber 24 through the flowpath in the first passageway 32. Similarly, second resilient means 70 which includes return springs 72 and 74 urge the second piston 26 toward the second pin 60. When piston 26 engages pin 60 as shown in FIG. 1, stem 50 engages pin 60 to position head 48 away from face seat 27 and allow communication of fluid from reservoir 16 into chamber 28 through the flowpath in the second passageway 36. In response to an actuation force from an operator, input member 76 connected to the second piston 26 simultaneously moves the second piston 26 and first piston 22 by way of return spring 72 in bore 14. At the same time valve return springs 74 and 68 move heads 48 and 40 associated with valves 46 and 38 into engagement with face seats 27 and 23, respectively to interrupt fluid communication through the flowpath of the second 36 and first 32 passageways and thereafter pressurize fluid in the second 28 and first 22 chambers by movement of the second 26 and first 22 pistons in bore 14. The master cylinder 10 functions in an adequate manner with through piston compensation without damage to the lip seals 21 and 25 located on pistons 22 and 26, respectively.

In more particular detail, the first 64 and second 70 resilient means include several common components which simplifies the construct of the master cylinder 10.

The second resilient means 70 in addition to return springs 72 and 74 also includes a first cylindrical member 76 which has a first base 78 on a first end and a first outwardly projecting flange 80 on a second end which is connected to a second cylindrical member 82 which has a second base 84 on a first end and a second outwardly projecting flange 86 on a second end by a linkage 88 formed by a rivet member. The first return spring 72 is located between said first 80 and second 86 outwardly projecting flanges. The linkage 88 which is located between the first 78 and second 84 bases, cages the first return spring 72 to define a maximum distance between the first 80 and second 86 outwardly projecting flanges. The second cylindrical member 82 has an first internal groove 90 located adjacent the second outwardly projecting flange 86 while piston 26 has an first external groove 92 located adjacent face seat 27. A first O-ring 94, a portion of which is located in the first internal groove 90 and a portion of which is located in the first external groove 92 to secure the second cylindrical member 82 to the second piston 26. Once the second cylindrical member 82 is joined to the second piston 26, return spring 74 is caged between base 84 and head 48. Cylindrical members 76 and 82 each have plurality of openings 77, 77' therein to allow fluid communication to occur therethrough.

The first resilient means 64 in addition to return springs 66 and 68 also includes a third cylindrical member 96 which has a first base 98 on a first end and a first outwardly projecting flange 100 on a second end. Return spring 66 which is located between the third outwardly projecting flange 100 and the bottom of bore 14 in housing 12. The third cylindrical member 96 has a second internal groove 102 located adjacent the third outwardly projecting flange 100 while piston 22 has a second external groove 104 located adjacent face seat 23. A second O-ring 106, a portion of which is located in the first external groove 102 and a portion of which is located in the first external groove 104 to secure the third cylindrical member 96 to the first piston 22. Once the third cylindrical member 96 is joined to the first piston 22, return spring 68 is caged between base 98 and head 40 of valve 38. Cylindrical member 96 also has plurality of openings 77, 77' therein to allow fluid communication to occur therethrough.

Under some circumstances the cylindrical bodies 82 and 96 may be attached to pistons 26 and 22 in a manner as shown in FIG. 2 with respect to piston 26. In this embodiment, components that are the same as in FIG. 1 are identified by the same number. A disc 200, as best shown in FIGS. 3 and 4 has a plurality of internal tangs 202, 202'...202$^n$ which are located in the external groove 92 on piston 26 and external tangs 204, 204'...204$^n$ that engage the second outwardly projecting flange 86 to connect the second cylindrical member 82 to the second piston 26. Once tangs 202, 202'...202$^n$ are located in groove 92, return spring 74 is caged between base 84 and head 48 on valve 46 to complete this portion of assembling a master cylinder.

The caging arrangement as shown in FIG. 2 may be more cost effective than the use of resilient O-rings 94 and 106 as disclosed in the embodiment of FIG. 1. It should also be evident that with the second outwardly projecting flange being located on the cylindrical member, lip seals 23 and 25 can be placed on the first 22 and second pistons 26 without being stretched in a manner which would create a stress point which may later deteriorate into a point of failure. In addition, since cylindrical members 82 and 96 are identical and under some circumstances even cylindrical member 76 would be identical, the number of component parts in the master cylinder 10 would be reduced which should also reduce the manufacturing cost of master cylinder 10.

We claim:
1. In a master cylinder for a brake system having a housing with a bore connected to a reservoir through first and second compensation ports, a first piston located in the bore to define a first pressure chamber and a second piston located in the bore to define a second pressure chamber, the first pressure chamber being connected to the reservoir through a first passageway in the first piston, the second pressure chamber being connected to the reservoir through a second passageway in the second piston, a first valve for controlling fluid communication through the first passageway, a second valve for controlling fluid communication through the second passageway, a first stop located in the bore for limiting the movement of the first piston in the bore, a second stop located in the bore for limiting the movement of the second piston in the bore, a first resilient means for urging the first piston toward the first stop, a second resilient means for urging the second piston toward the second stop and an input member for moving the second piston to simultaneously interrupt communication through the first and second passageways to thereafter pressurize fluid in the first and second chambers by movement of the first and second pistons, the improvement in the second resilient means comprising:

a first cylindrical member having a first base on a first end and a first outwardly projecting flange on a second end;

a second cylindrical member having a second base on a first end and a second outwardly projecting flange on a second end;

a first spring located between said first and second outwardly projecting flanges;

linkage means located between said first and second bases for caging said first spring to define a maximum distance between said first and second outwardly projecting flanges; and first attachment means having a first ring with a first portion thereof located in a first internal groove in said second cylindrical member adjacent said second outwardly projecting flange and a second portion thereof located in a first external groove in said second piston for joining said second cylindrical member to the second piston, said first spring transferring movement of the second piston to the first piston to provide for initial simultaneous movement of the first and second pistons in response to a force applied to the input member.

2. The master cylinder for a brake system as recited in claim 1 further including:
   a second spring connected to said second base of the second cylindrical member for urging said second value means toward said second stop and into engagement with the second piston on movement of the second piston by said input member to interrupt fluid communication through said second passageway and allow the development of pressurizing fluid in said second pressurizing chamber 3. The master cylinder for a brake system as recited in claim 2 further including:
   a second spring connected to said second base of the second cylindrical member for urging said second valve means toward said second stop and into engagement with said second piston on movement of said second piston by said input member to interrupt fluid communication through said second passageway and allow the development of pressurizing fluid in said second pressurizing chamber.

4. The master cylinder for a brake system as recited in claim 3 wherein said first resilient means includes;
   a third cylindrical member having a third base on a first end and a third outward projecting flange on a second end;
   a third spring located between said third outwardly projecting flange and said housing; and
   second attachment means for joining said third cylindrical member to the first piston, said third spring urging the first piston toward said first stop.

5. The master cylinder for a brake system as recited in claim 4 wherein said second attachment means includes:
   a second internal groove located in said third cylindrical member adjacent said third outwardly projecting flange; and
   a second external groove located in said first piston; and
   a second ring a portion of which is located in said second external groove and a portion of which is located in said second external groove, said second ring securing said third cylindrical member to said first piston.

6. The master cylinder for a brake system as recited in claim 5 further including:
   a fourth spring connected to said third base of the third cylindrical member for urging said first valve means toward said first stop and into engagement with said first piston on movement of said first piston by an input transmitted through said second springs in responds to movement by said input member to interrupt fluid communication through said first passageway and allow the development of pressurizing fluid in said first pressurizing chamber.

7. In a master cylinder for a brake system having a housing with a bore connected to a reservoir through first and second compensation ports, a first piston located in the bore to define a first pressure chamber and a second piston located in the bore to define a second pressure chamber, the first pressure chamber being connected to the reservoir through a first passageway in the first piston, the second pressure chamber being connected to the reservoir through a second passageway in the second piston, a first valve for controlling fluid communication through the first passageway, a second valve for controlling fluid communication through the second passageway, a first stop located in the bore for limiting the movement of the first piston in the bore, a second stop located in the bore for limiting the movement of the second piston in the bore, a first resilient means for urging the first piston toward the first stop, a second resilient means for urging the second piston toward the second stop and an input member for moving the second piston to simultaneously interrupt communication through the first and second passageways to thereafter pressurize fluid in the first and second chambers by movement of the first and second pistons, the improvement in the second resilient means comprising:
   a first cylindrical member having a first base on a first end and a first outwardly projecting flange on a second end;
   a second cylindrical member having a second base on a first end and a second outwardly projecting flange on a second end;
   a first spring located between said first and second outwardly projecting flanges;
   linkage means located between said first and second bases for caging said first spring to define a maximum distance between said first and second outwardly projecting flanges; and
   first attachment means having a first disc having internal tangs located in a first external groove located on said second piston and external tangs that engage said second outwardly projecting flange for joining said second cylindrical member to the second piston, said first spring transferring movement of the second piston to the first piston to provide for initial simultaneous movement of the first and second pistons in response to a force applied to the input member.

8. The master cylinder for a brake system as recited in claim 7 further including:
   a second spring connected to said second base of the second cylindrical member for urging said second valve means toward said second stop and into engagement with the second piston on movement of the second piston by said input member to interrupt fluid communication through said second passageway and allow the development of pressurizing fluid in said second pressurizing chamber.

9. The master cylinder for a brake system as recited in claim 8 wherein said first resilient means includes;
   a third cylindrical member having a third base on a first end and a third outward projecting flange on a second end;
   a third spring located between said third outwardly projecting flange and said housing; and
   second attachment means for joining said third cylindrical member to the first piston, said third spring urging the first piston toward said first stop.

10. The master cylinder for a brake system as recited in claim 9 wherein said second attachment means includes:
    a second external groove located in said first piston; and
    a second disc having internal tangs located in said second external groove and external tangs that engage said third outwardly projecting flange for joining said third cylindrical member to said first piston.

11. The master cylinder for a brake system as recited in claim 10 further including:

a fourth spring connected to said third base of the third cylindrical member for urging said first valve means toward said first stop and into engagement with said first piston on movement of said first piston by an input transmitted through said second springs in responds to movement by said input member to interrupt fluid communication through said first passageway and allow the development of pressurizing fluid in said first pressurizing chamber.

* * * * *